(12) United States Patent
Einheuser et al.

(10) Patent No.: US 7,166,944 B2
(45) Date of Patent: Jan. 23, 2007

(54) COOLING PLATE FOR ALTERNATOR RECTIFIER

(75) Inventors: Gary Michael Einheuser, Milford, MI (US); Jeanne M. Schiavone, Howell, MI (US); Michael Edward Harris, Saline, MI (US); Shyr-Ing Hu, Bloomfield Hills, MI (US); Paul Michael Evans, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 29 days.

(21) Appl. No.: 11/062,217

(22) Filed: Feb. 18, 2005

(65) Prior Publication Data

US 2006/0186745 A1     Aug. 24, 2006

(51) Int. Cl.
*H02K 9/00* (2006.01)
*H02K 11/00* (2006.01)

(52) U.S. Cl. ...................... 310/68 D; 310/64
(58) Field of Classification Search ............. 310/67 R, 310/68 D
See application file for complete search history.

(56) References Cited

U.S. PATENT DOCUMENTS

| | | | |
|---|---|---|---|
| 3,684,944 A | 8/1972 | Evgrafov et al. | |
| 3,697,814 A | 10/1972 | Christman et al. | |
| 3,916,435 A | 10/1975 | Camplin et al. | |
| 3,979,659 A * | 9/1976 | Lynch et al. ................. | 363/145 |
| 4,472,649 A | 9/1984 | Namba et al. | |
| 4,841,182 A | 6/1989 | Tsuchiya et al. | |
| 5,206,793 A | 4/1993 | Boudrant et al. | |
| 5,258,673 A | 11/1993 | Gotoh | |
| 5,640,062 A | 6/1997 | Yockey | |
| 5,757,096 A | 5/1998 | DuBois et al. | |
| 5,821,674 A | 10/1998 | Weiner | |
| 5,828,564 A | 10/1998 | Mori et al. | |
| 5,892,308 A | 4/1999 | Abadia et al. | |
| 6,150,196 A | 11/2000 | Tanaka et al. | |
| 6,184,600 B1 | 2/2001 | Asao et al. | |
| 6,204,581 B1 | 3/2001 | Lo | |
| 6,247,527 B1 * | 6/2001 | Paulman ...................... | 165/152 |
| 6,429,556 B1 | 8/2002 | Nakamura et al. | |
| 6,538,352 B1 | 3/2003 | Asao | |
| 6,561,267 B1 * | 5/2003 | Sauciuc et al. ............. | 165/185 |
| 6,580,187 B1 * | 6/2003 | Bradfield ..................... | 310/64 |
| 6,700,243 B1 | 3/2004 | Asao | |
| 6,731,030 B1 | 5/2004 | Keidar et al. | |
| 6,734,587 B1 | 5/2004 | Hirsou et al. | |
| 6,740,995 B1 | 5/2004 | Oohashi et al. | |
| 6,784,576 B1 | 8/2004 | Nguyen | |
| 7,075,201 B1 * | 7/2006 | Takahashi et al. ......... | 310/68 D |
| 7,095,144 B1 * | 8/2006 | Kashihara ................. | 310/68 D |
| 2003/0042808 A1 | 3/2003 | Keidar et al. | |
| 2003/0178899 A1 | 9/2003 | Aeschlimann et al. | |

(Continued)

*Primary Examiner*—Burton Mullins
(74) *Attorney, Agent, or Firm*—Brinks Hofer Gilson & Lione

(57) ABSTRACT

A diode plate for an electric machine includes a body having a thickness and defining a central axis thereof. A plurality of cooling plates having a uniform thickness of 1 millimeter or less over the entire surface area of the cooling plates are mounted onto the body of the diode plate. A plurality of louvered slots may be formed within each of the cooling plates. Each louvered slot has a louvered portion that extends from the cooling plate at a predetermined angle relative to the cooling plate.

32 Claims, 6 Drawing Sheets

U.S. PATENT DOCUMENTS

| | | |
|---|---|---|
| 2003/0198068 A1 | 10/2003 | Bradfield |
| 2004/0000817 A1 | 1/2004 | Hirsou et al. |
| 2004/0012274 A1* | 1/2004 | Aeschlimann et al. .... 310/68 D |
| 2004/0041476 A1 | 3/2004 | Ihata et al. |
| 2004/0051409 A1 | 3/2004 | Nakamura et al. |
| 2004/0100808 A1 | 5/2004 | Braun et al. |
| 2004/0174081 A1 | 9/2004 | Einheuser et al. |
| 2004/0182542 A1* | 9/2004 | Take et al. .................. 165/80.3 |

* cited by examiner

COOLING PLATE FOR ALTERNATOR RECTIFIER

BACKGROUND

1. Field of the Invention

The present invention relates generally to rectifier for an alternator with improved cooling characteristics.

2. Description of Related Technology

In most alternators, internal fans pull ambient air into openings in the rear of the alternator. As the air flows through the alternator and across the components of the alternator the air heats up. This heated air exits from the inside of the alternator through openings in the outer diameter of the rear housing, but the difference between the heated air and the hot housing is not large enough to provide sufficient cooling to the housing. In some alternators, a rectifier or diode plate is mounted onto an end of the alternator. The diode plate can include fins to provide surface area for cooling of the alternator and diode plate. However, often, the surface area of the fins is not sufficient to provide adequate cooling of the alternator and diode plate. Therefore, there is a need for an alternator rectifier with more efficient and effective cooling of the alternator components and the housing.

SUMMARY

A diode plate incorporating the features of the present application includes a body and defining a central axis thereof. A plurality of cooling plates are mounted onto the body, and each cooling plate has a plurality of louvered slots formed therein. Each of the louvered slots includes a louvered portion that extends from the cooling plate at a predetermined angle relative to the cooling plate.

In one aspect, the body is generally cylindrical shaped and includes a circumferential slot formed therein. The circumferential slot presents a radially inward facing surface and a radially outward facing surface. The cooling fins are mounted to and extend between the radially inward facing surface and the radially outward facing surface.

In another aspect the body is generally cylindrical shaped and presents a radially inward facing surface. In this embodiment, the cooling fins are mounted onto the radially inward facing surface.

In still another aspect, the body is generally cylindrical shaped and presents a radially outward facing surface. In this embodiment, the cooling fins are mounted onto the radially outward facing surface.

In yet another aspect, the cooling plates can be individually formed and mounted, wherein the individually formed cooling plates are spaced circumferentially about the body of the diode plate and oriented radially thereon.

In still another aspect, the cooling plates can be formed integrally with one another from a continuous strip of material that is folded in a ribbon like manner prior to mounting on the body of the diode plate.

DESCRIPTION OF THE DRAWINGS

The above, as well as other advantages of the present invention, will become readily apparent to those skilled in the art from the following detailed description of the embodiments when considered in the light of the accompanying drawings in which.

DESCRIPTION OF THE EMBODIMENTS

Figure 1:
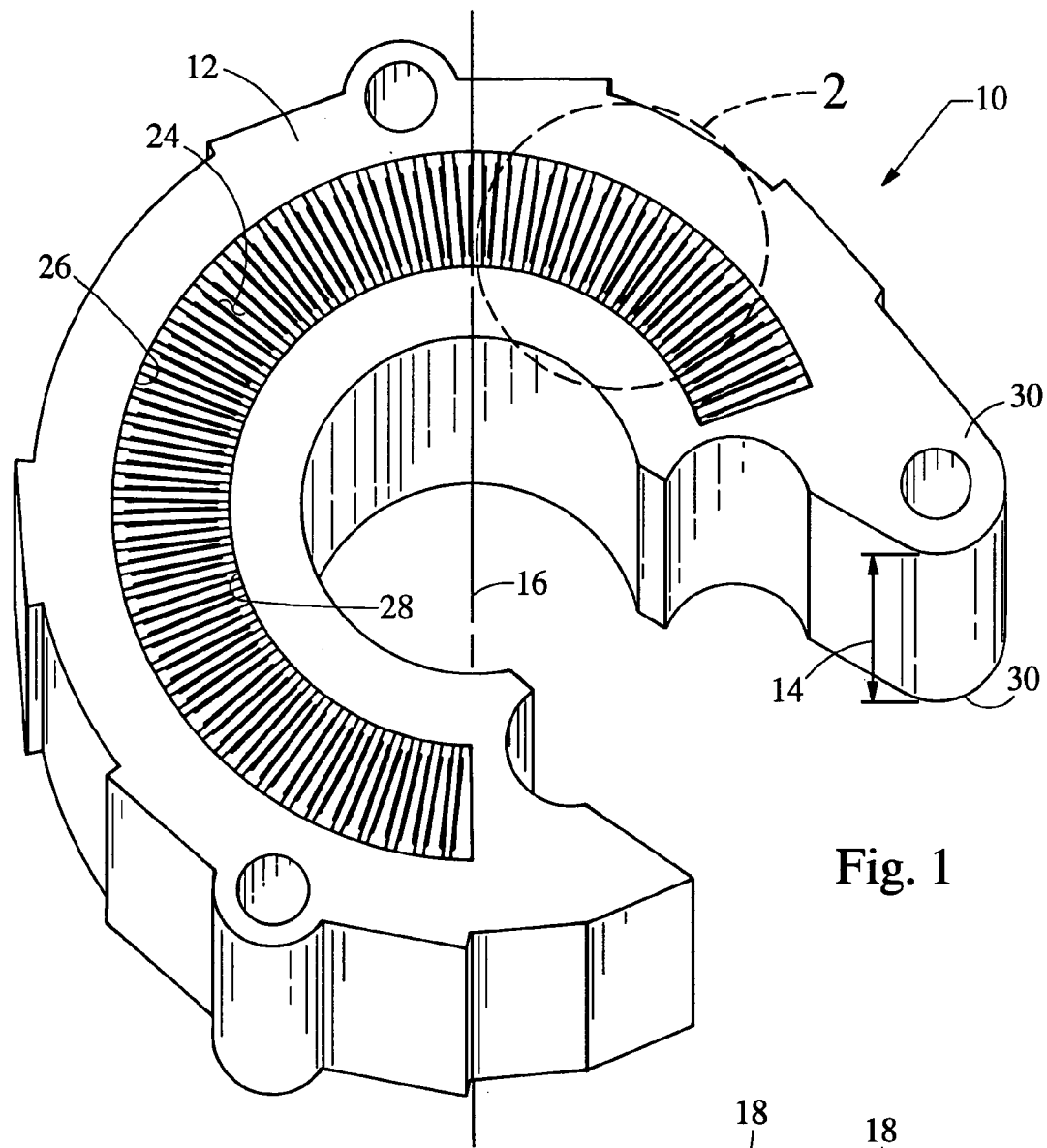
FIG. 1 is a perspective view of a diode plate having features of the present application.
Figure 2:
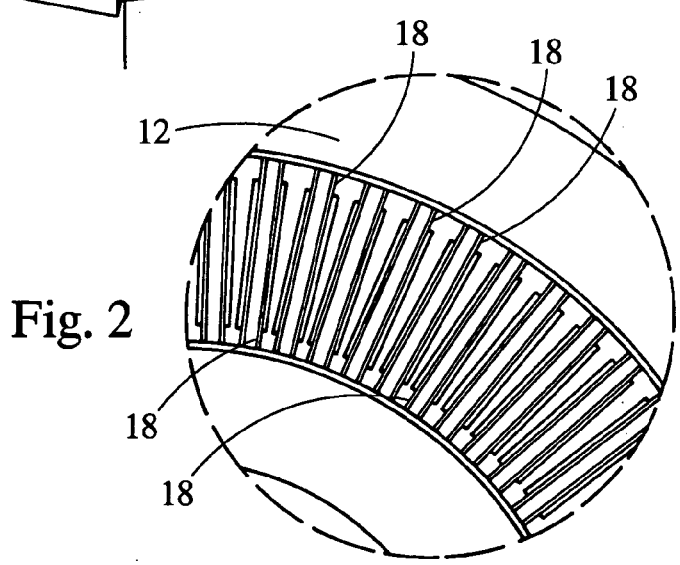
FIG. 2 is a enlarged view of a portion of FIG. 1, wherein the louvered slots are oriented perpendicular to the central axis.

Referring now to FIGS. 1 and 2, a diode plate 10 of the present invention includes a body 12 having a thickness, as indicated by reference numeral 14, and defining a central axis 16 thereof. The diode plate 10 is adapted to support a plurality of diodes mounted thereon. Preferably, the diode plate 10 is made of a conductive material to facilitate conductive transfer of heat from an alternator onto which the diode plate is mounted, and the diodes, into the diode plate 10.

A plurality of cooling plates 18 are mounted onto the body 12. The thickness of each of the cooling plates 18 is consistent over the entire surface of the cooling plates 18. This is possible because the cooling plates 18 are formed by stamping, forging, machining, extruding, or other appropriate manufacturing processes. This cannot be achieved with fins cast integral to the diode plate, which is common in these applications. A cast cooling fin or plate cannot have a consistent thickness due to the draft angle that is required to allow the cast part to be removed from the mold. Furthermore, the cooling plates 18 have a thickness that is less than or up to about 1 millimeter. Again, this is possible due to the way the cooling plates 18 are formed. Forgings or castings cannot easily be made to thicknesses of less than 1 millimeter.

Figure 3:
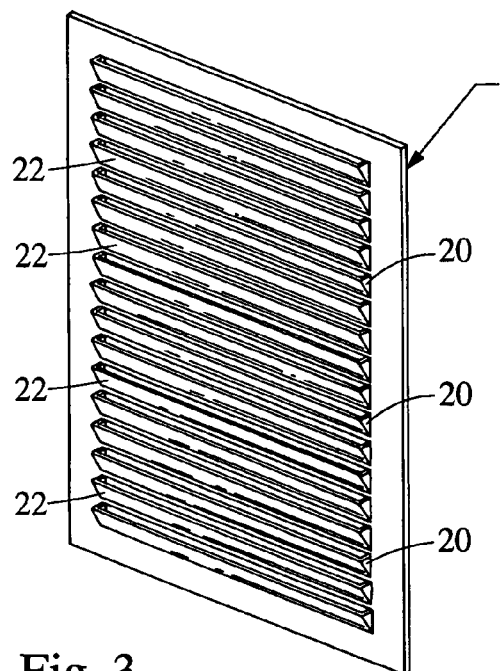
FIG. 3 is a perspective view of an individual cooling plate having louvered slots oriented perpendicular to the central axis of the diode plate.
Figure 4A:
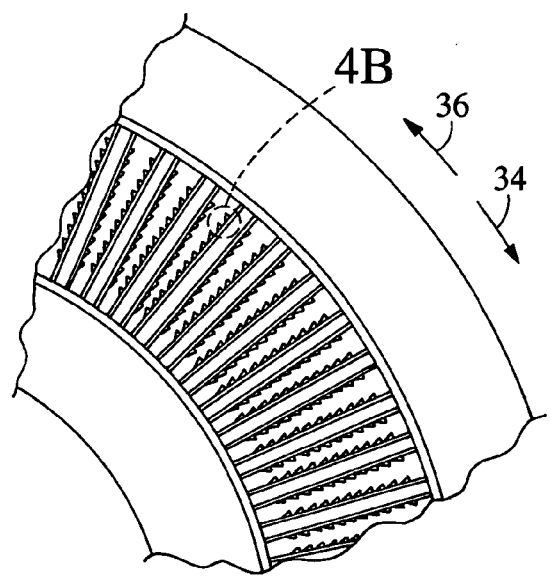
FIG. 4a is a view similar to FIG. 2 wherein the louvered slots are oriented along the central axis.
Figure 4B:
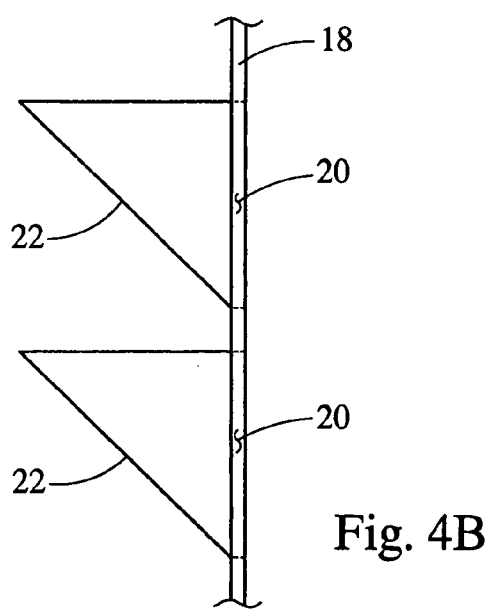
FIG. 4b is an enlarged view of a portion of FIG. 4a, wherein the louvered portions are planar.
Figure 4C:
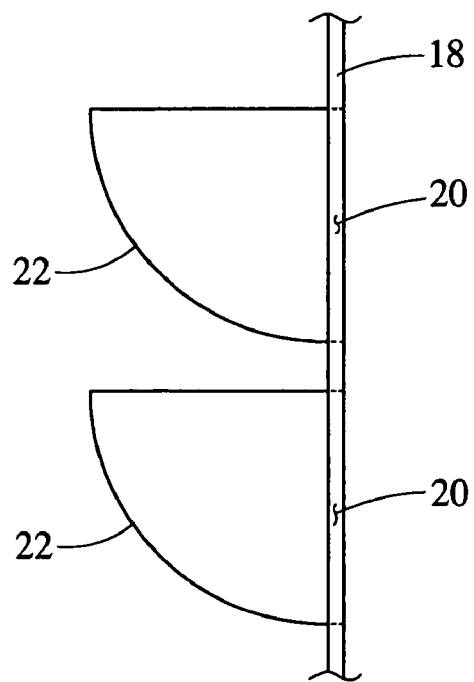
FIG. 4c is an enlarged view of a portion of FIG. 4a, wherein the louvered portions are arcuate.

Referring to FIG. 3, each of the cooling plates 18 has a plurality of louvered slots 20 formed therein. Each of the louvered slots 20 includes a louvered portion 22 that extends from the cooling plate 18 at a predetermined angle relative to the cooling plate 18. Preferably, the cooling plates 18 are made from a conductive material similar to the diode body 12. The louvered slots 20 within the cooling plates 18 provide significantly more surface area for heat transfer between the ambient air and the cooling plates 18. Further, the angle of the louvered portions 22 of the louvered slots 20 provides different angles to direct the air flow over the cooling plates 18. Further, the louvered portions 22 can be generally planar as shown in FIG. 4b, or the louvered portions 22 can be non-planar or arcuate, as shown in FIG. 4c.

Figure 5:
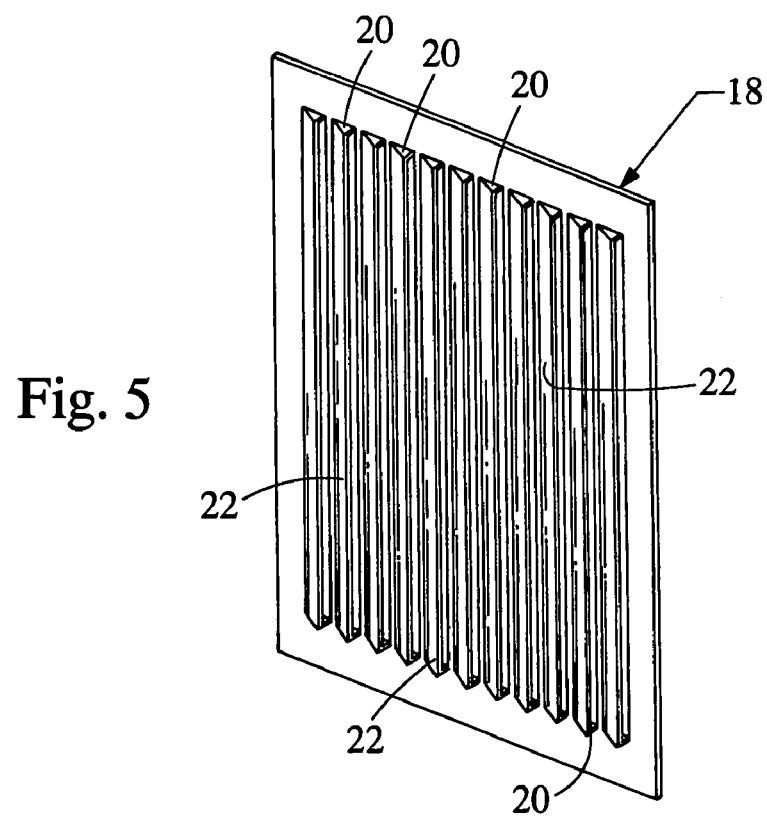
FIG. 5 is a perspective view of an individual cooling plate having louvered slots oriented along the central axis of the diode plate.

The louvered slots 20 can be oriented perpendicular to the central axis 16 of the diode plate 10, as shown in FIGS. 1, 2, and 3. Alternatively, the louvered slots 20 can be oriented along the central axis 16, as shown in FIGS. 4a and 5. It should also be understood that the louvered slots 20 could be oriented at any desired angel relative to the central axis 16.

As shown in FIG. 1, in this embodiment the body 12 is generally cylindrical shaped includes a circumferential slot 24 formed therein. The circumferential slot 24 presents a radially inward facing surface 26 and a radially outward facing surface 28. The cooling plates 18 are mounted to and extend between the radially inward facing surface 26 and the radially outward facing surface 28.

The cooling plates 18 can have the same height as the thickness 14 of the body 12 of the diode plate 10, as shown in FIG. 1, or alternatively, the cooling plates 18 can extend only partially between opposing ends 30 of the diode plate 10. Also, the cooling plates 18 can be taller than the diode plate 10, wherein the cooling plates 18 extend beyond one or both of the opposing ends 30 of the diode plate 10.

Figure 6:
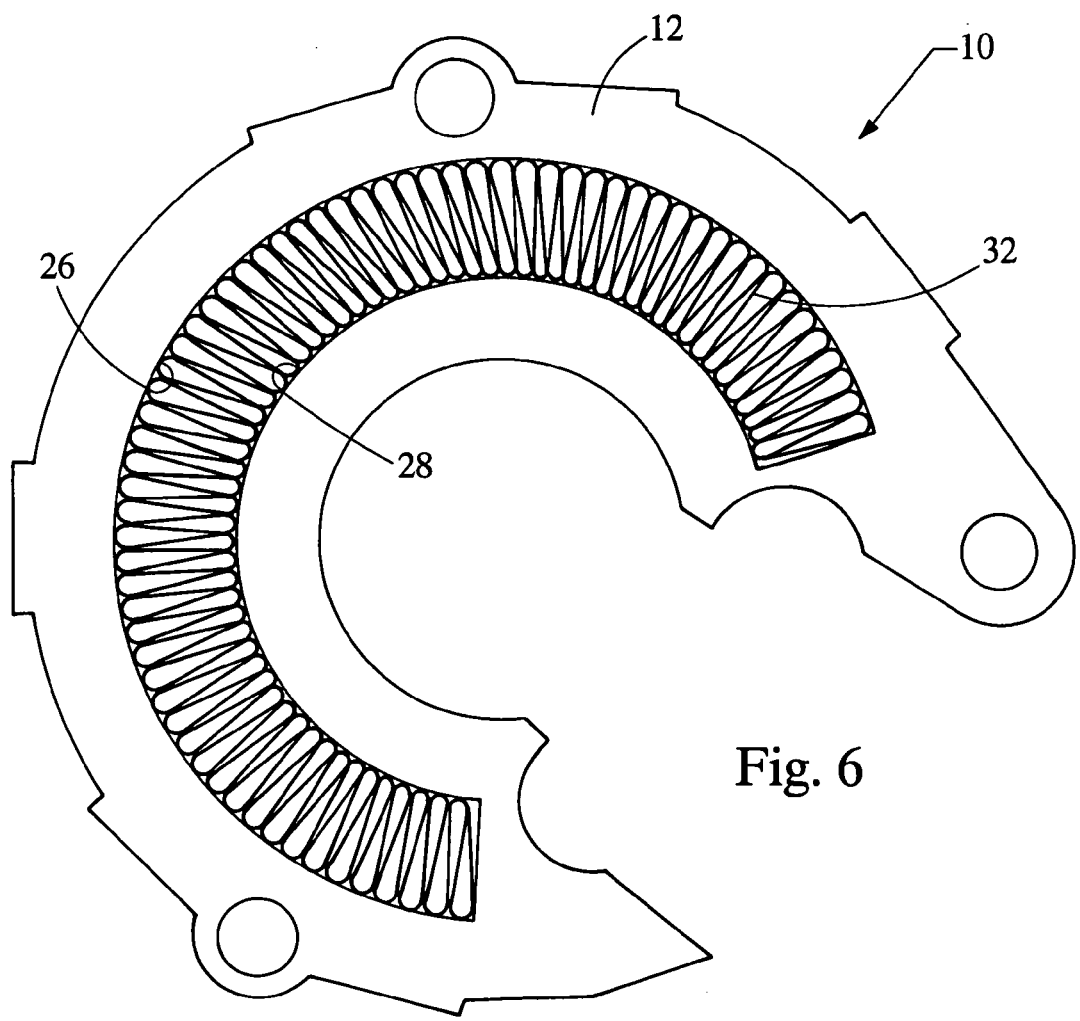
FIG. 6 Is an end view of a diode plate having cooling plates formed in a continuous ribbon shape.
Figure 7:
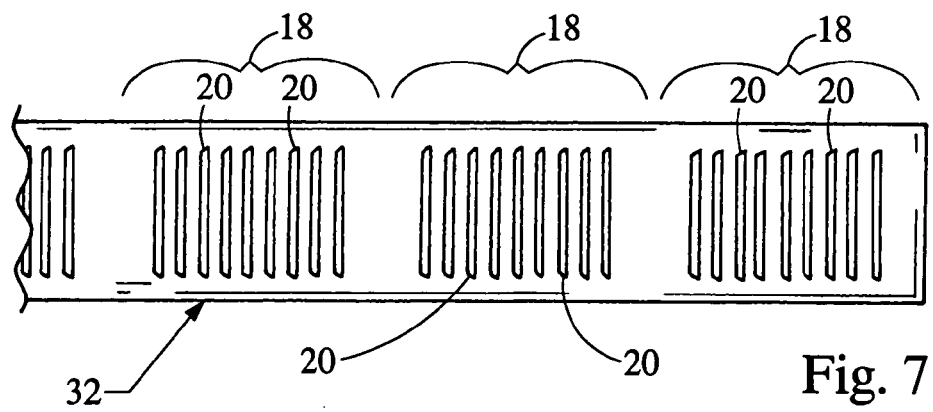
FIG. 7 Is a side view of a continuous strip of material having cooling plates formed therein prior to being formed into a ribbon shape, the louvered slats are oriented along the central axis.
Figure 8:
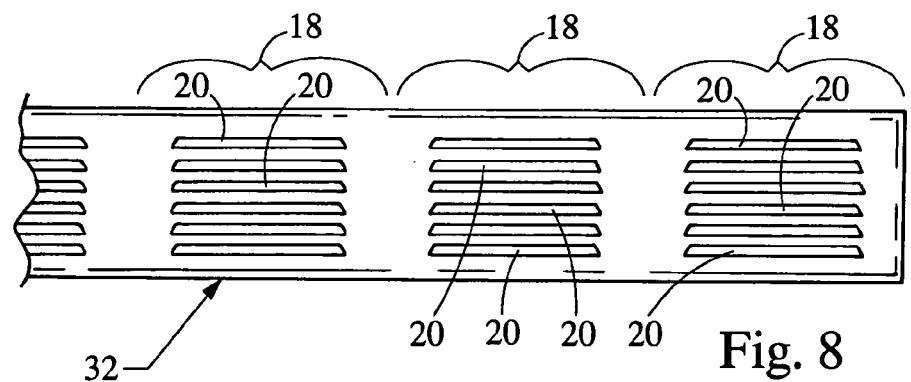
FIG. 8 is a side view of a continuous strip of material having cooling plates formed therein prior to being formed into a ribbon shape, the louvered slots are oriented perpendicular to the central axis.

The cooling plates 18 can be individually formed and mounted as shown in FIGS. 1 through 5. Referring to FIGS. 2 and 4a, the individually formed cooling plates 18 are spaced circumferentially within the circumferential slot 24 and oriented radially therein. Alternatively, the cooling plates 18 can be formed integrally with one another from a continuous strip 32 of material, as shown in FIGS. 7 and 8. Referring to FIG. 6, the continuous strip 32 is folded in a ribbon like manner prior to mounting on the body 12 of the diode plate 10. As mentioned previously, the louvered slots 20 within the cooling plates 18 can be oriented along the central axis 16, as shown in FIG. 7, or perpendicular to the central axis 16, as shown in FIG. 8.

Figure 9:
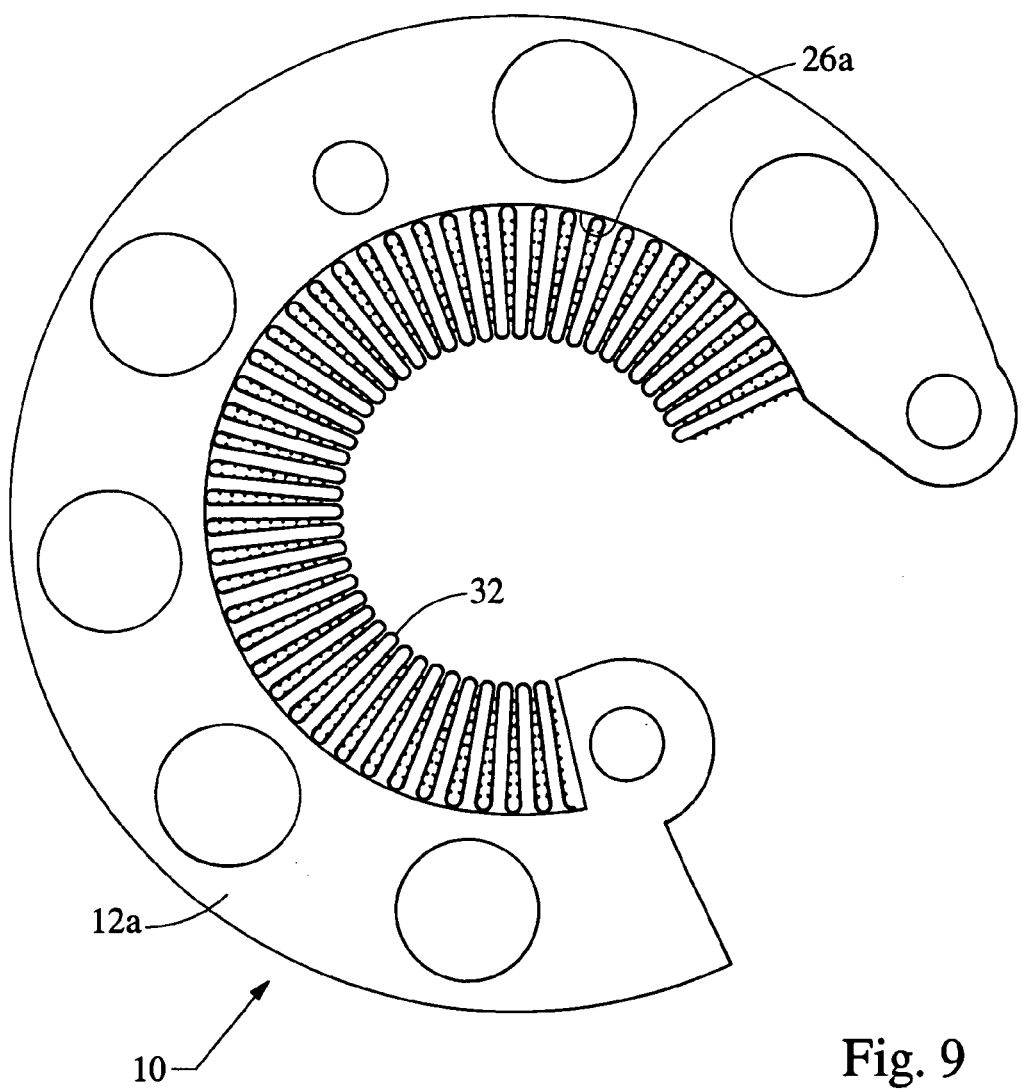
FIG. 9 is a top view of a diode plate wherein the body presents a radially inward facing surface onto which the cooling plates are mounted.

Referring to FIG. 9, in an alternative embodiment, the body 12a is generally cylindrical shaped and presents a radially inward facing surface 26a. In this embodiment, the cooling fins 18 are mounted onto the radially inward facing surface 26a.

The cooling plates 18 can be individually formed and mounted as previously discussed, wherein the individually formed cooling plates 18 are spaced circumferentially along the radially inward facing surface 26a and oriented radially thereon. Alternatively, the cooling plates 18 can be formed integrally with one another from a continuous strip 32 of material, as shown in FIG. 9, wherein the continuous strip 32 is folded in a ribbon like manner prior to mounting on the body 12a of the diode plate 10. As mentioned previously, the louvered slots 20 within the cooling plates 18 can be oriented along the central axis 16, as shown in FIG. 7, or perpendicular to the central axis 16, as shown in FIG. 8.

Figure 10:
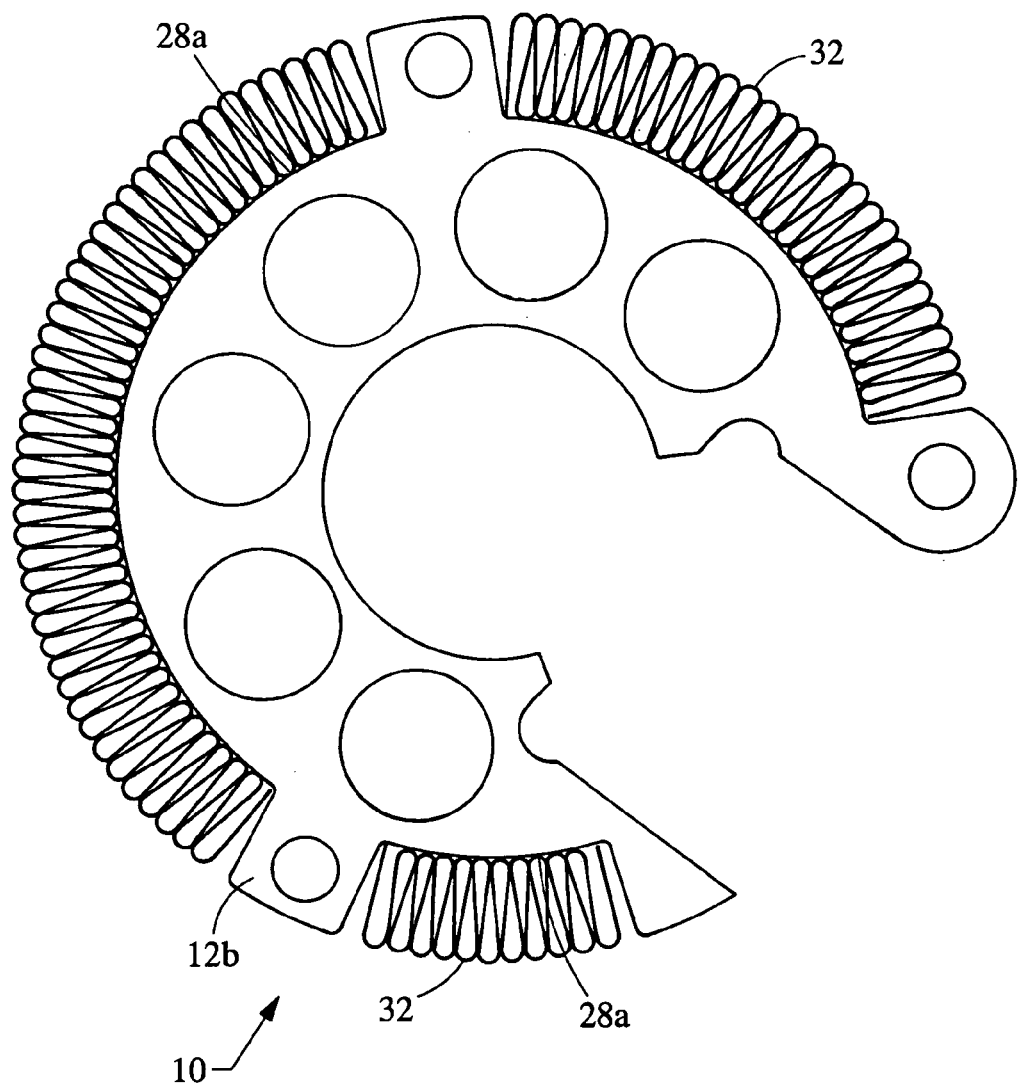
FIG. 10 is a top view of a diode plate wherein the body presents a radially outward facing surface onto which the cooling plates are mounted.

Referring to FIG. 10, in another alternative embodiment, the body 12b is generally cylindrical shaped and presents a radially outward facing surface 28a. In this embodiment, the cooling fins 18 are mounted onto the radially outward facing surface 28a.

The cooling plates 18 can be individually formed and mounted as previously discussed, wherein the individually formed cooling plates 18 are spaced circumferentially along the radially outward facing surface 28a and oriented radially thereon. Alternatively, the cooling plates 18 can be formed integrally with one another from a continuous strip 32 of material, as shown in FIG. 10, wherein the continuous strip 32 is folded in a ribbon like manner prior to mounting on the body 12b of the diode plate 10. As mentioned previously, the louvered slots 20 within the cooling plates 18 can be oriented along the central axis 16, as shown in FIG. 7, or perpendicular to the central axis 16, as shown in FIG. 8.

In all of the previously discussed embodiments, the cooling plates 18 are attached to the body 12, 12a, 12b of the diode plate by brazing or other suitable methods. Any suitable attachment can be used so long as conductive heat transfer between the cooling plates 18 and the body 12, 12a, 12b of the diode plate 10 is not interrupted.

Referring to FIGS. 2 and 4a, the louvered portions 22 of the louvered slots 20 of any one of the cooling plates 18 extend from the cooling plate 18 in a direction opposite of the louvered slots 20 of adjacent cooling plates 18 on either side of that particular cooling plate 18. The result is that the louvered portions 22 extend in either the clockwise, indicated by arrow 34, or counterclockwise, indicated by arrow 36, direction in an alternating pattern circumferentially about the body 12 of the diode plate 10.

The angle of the louvered portions 22, the orientation of the louvered slots 20, and the alternating pattern of the extending louvered portions 22 all work to provide more effective cooling of the alternator by facilitating better heat transfer between the cooling plates 18 and air as a fan of the alternator draws ambient air over the cooling plates 18.

As shown, the louvered slots 20 are oriented parallel to one another. It should be understood that the louvered slots 20 could also be oriented at angles to one another.

In accordance with the provisions of the patent statutes, the features of the present application have been described in various specific embodiments. However, it should be noted that the features of the present application can be practiced otherwise than as specifically illustrated and described herein.

What is claimed is:

1. A diode plate for an electric machine comprising:
 a body having a thickness and defining a central axis thereof;
 a plurality of cooling plates mounted onto said body, each of said cooling plates having a consistent thickness over the entire area of said cooling plates wherein the thickness of said cooling plates is 1 millimeter or less;
 a plurality of louvered slots formed within each of said cooling plates, each louvered slot having a louvered portion extending from said cooling plate at a predetermined angle relative to said cooling plate.

2. The diode plate of claim 1 wherein said body is generally cylindrical shaped and presents a radially inward facing surface, said cooling plates being mounted onto said radially inward facing surface.

3. The diode plate of claim 2 wherein said cooling plates are individually mounted, radially oriented, and circumferentially spaced about said body.

4. The diode plate of claim 2 wherein said cooling plates are formed integrally with one another from a continuous strip of material, said continuous strip being folded in a ribbon like manner.

5. The diode plate of claim 1 wherein said body is generally cylindrical shaped and presents an radially outward facing surface, said cooling fins being mounted onto said radially outward facing surface.

6. The diode plate of claim 5 wherein said cooling plates are individually mounted, radially oriented, and circumferentially spaced about said body.

7. The diode plate of claim 5 wherein said cooling plates are formed integrally with one another from a continuous strip of material, said continuous strip being folded in a ribbon like manner.

8. The diode plate of claim 1 wherein said body is generally cylindrical in shape and includes a circumferential slot formed therein, said circumferential slot presenting a radially inward facing surface and a radially outward facing surface, said cooling fins being mounted to and extending between said radially inward facing surface and said radially outward facing surface.

9. The diode plate of claim 8 wherein said cooling plates are individually mounted, radially oriented, and circumferentially spaced about said body.

10. The diode plate of claim 8 wherein said cooling plates are formed integrally with one another from a continuous strip of material, said continuous strip being folded In a ribbon like manner.

11. The diode plate of claim 1 wherein said louvered slots are oriented along said central axis of said diode plate.

12. The diode plate of claim 1 wherein said louvered slats are oriented at an angle relative to said central axis of said diode plate.

13. The diode plate of claim 12 wherein said louvered slots are oriented at an angle of 90 degrees relative to said central axis of said diode plate.

14. The diode plate of claim 1 wherein said louvered portions of said louvered slots of any one of said cooling plates extend from said cooling plate in a direction opposite of the louvered slots of adjacent cooling plates on either side of said one cooling plate.

15. The diode plate of claim 1 wherein each of said louvered slots within any one cooling plate are oriented parallel to one another.

16. The diode plate of claim 1 wherein the louvered portions are generally planar.

17. The diode plate of claim 1 wherein the louvered portions are generally arcuate.

18. A diode plate for an electric machine comprising:
a body having a thickness and defining a central axis thereof, said body being generally cylindrical shaped and presenting a radially inward facing surface,
a plurality of cooling plates mounted onto said body each of said cooling plates having a consistent thickness over the entire area of said cooling plates said cooling plates being mounted onto said radially inward facing surface.

19. The diode plate of claim 18 wherein said cooling plates are individually mounted, radially oriented, and circumferentially spaced about said body.

20. The diode plate of claim 18 wherein said cooling plates are formed integrally with one another from a continuous strip of material, said continuous strip being folded in a ribbon like manner.

21. The diode plate of claim 18 wherein a plurality of louvered slots formed within each of said cooling plates, each louvered slot having a louvered portion extending from said cooling plate at a predetermined angle relative to said cooling plate.

22. The diode plate of claim 18 wherein the thickness of said cooling plates is 1 millimeter or less.

23. A diode plate for an electric machine comprising:
a body having a thickness and defining a central axis thereof, said body being generally cylindrical shaped and presenting a radially outward facing surface,
a plurality of cooling elates mounted onto said body, each of said cooling plates having a consistent thickness over the entire area of said cooling plates said cooling plates being mounted onto said radially outward facing surface.

24. The diode plate of claim 23 wherein said cooling plates are individually mounted, radially oriented, and circumferentially spaced about said body.

25. The diode plate of claim 23 wherein said cooling plates are formed integrally with one another from a continuous strip of material, said continuous strip being folded in a ribbon like manner.

26. The diode plate of claim 23 wherein a plurality of louvered slots formed within each of said cooling plates, each louvered slot having a louvered portion extending from said cooling plate at a predetermined angle relative to said cooling plate.

27. The diode plate of claim 23 wherein the Thickness of said cooling plates is 1 millimeter or less.

28. A diode plate for an electric machine comprising:
a body having a thickness and defining a central axis thereof, said body being generally cylindrical in shape and including a circumferential slot formed therein, said circumferential slot presenting a radially inward facing surface and a radially outward facing surface; and
a plurality of cooling plates mounted onto said body, each of said cooling plates having a consistent thickness over the entire area of said cooling plates, said cooling plates being mounted to and extending between said radially inward facing surface and said radially outward facing surface.

29. The diode plate of claim 28 wherein said cooling plates are individually mounted, radially oriented, and circumferentially spaced about said body.

30. The diode plate of claim 28 wherein said cooling plates are formed integrally with one another from a continuous strip of material, said continuous strip being folded in a ribbon like manner.

31. The diode plate of claim 28 wherein a plurality of louvered slots formed within each of said cooling plates, each louvered slot having a louvered portion extending from said cooling plate at a predetermined angle relative to said cooling plate.

32. The diode plate of claim 28 wherein the thickness of said cooling plates is 1 millimeter or less.

* * * * *

UNITED STATES PATENT AND TRADEMARK OFFICE
CERTIFICATE OF CORRECTION

PATENT NO. : 7,166,944 B2
APPLICATION NO. : 11/062217
DATED : January 23, 2007
INVENTOR(S) : Gary Michael Einheuser et al.

It is certified that error appears in the above-identified patent and that said Letters Patent is hereby corrected as shown below:

On the Title Page #56

In column 2, line 9, after "6,538,352" delete "B1" and substitute --B2-- in its place.

In column 2, line 12, after "6,700,243" delete "B1" and substitute --B2-- in its place.

In column 2, line 13, after "6,731,030" delete "B1" and substitute --B2-- in its place.

In column 2, line 14, after "6,734,587" delete "B1" and substitute --B2-- in its place.

In column 2, line 15, after "6,740,995" delete "B1" and substitute --B2-- in its place.

In column 2, line 16, after "6,784,576" delete "B1" and substitute --B2-- in its place.

In column 2, line 17, after "7,075,201" delete "B1" and substitute --B2-- in its place.

In column 2, line 18, after "7,095,144" delete "B1" and substitute --B2-- in its place.

In the Claims

Column 5 line 17, after "strip being folded" delete "In" and substitute --in-- in its place.

Column 5, line 21, after "said louvered" delete "slats" and substitute --slots-- in its place.

Column 6, line 7, after "of cooling" delete "elates" and substitute --plates-- in its place.

Column 6, line 9, immediately after "said cooling plates" insert --,-- (comma).

Column 6, line 24, after "wherein the" delete "Thickness" and substitute --thickness-- in its place.

UNITED STATES PATENT AND TRADEMARK OFFICE
CERTIFICATE OF CORRECTION

PATENT NO. : 7,166,944 B2
APPLICATION NO. : 11/062217
DATED : January 23, 2007
INVENTOR(S) : Gary Michael Einheuser et al.

It is certified that error appears in the above-identified patent and that said Letters Patent is hereby corrected as shown below:

In the Claims (cont'd)

Column 6, line 33, after "a plurality of cooling" delete "plates" and substitute --fins-- in its place.

Column 6, line 36, before "being mounted to" delete "plates" and substitute --fins-- in its place.

Signed and Sealed this

Twenty-fourth Day of April, 2007

JON W. DUDAS
*Director of the United States Patent and Trademark Office*